US012668052B2

(12) United States Patent
Zhang et al.

(10) Patent No.: US 12,668,052 B2
(45) Date of Patent: Jun. 30, 2026

(54) WIPING DEVICE FOR STENCIL PRINTER

(71) Applicant: Illinois Tool Works Inc., Glenview, IL (US)

(72) Inventors: Jian Zhang, Glenview, IL (US); Zhanqing Guo, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/994,288

(22) PCT Filed: Jul. 25, 2023

(86) PCT No.: PCT/US2023/028541
§ 371 (c)(1),
(2) Date: Jan. 14, 2025

(87) PCT Pub. No.: WO2024/025860
PCT Pub. Date: Feb. 1, 2024

(65) Prior Publication Data
US 2026/0027819 A1 Jan. 29, 2026

(30) Foreign Application Priority Data
Jul. 27, 2022 (CN) ......................... 202210890351.9
Jul. 6, 2023 (CN) ......................... 202310833112.4

(51) Int. Cl.
*B41F 15/44* (2006.01)
*B05C 11/04* (2006.01)

(52) U.S. Cl.
CPC ............ *B41F 15/44* (2013.01); *B05C 11/048* (2013.01); *B41P 2215/10* (2013.01)

(58) Field of Classification Search
CPC ..... B41F 15/44; B05C 11/048; B41P 2215/10
See application file for complete search history.

(56) References Cited

U.S. PATENT DOCUMENTS 4,122,771 A * 10/1978 Barton .................... B41F 15/44
15/245
5,660,632 A 8/1997 Volpe, Jr. et al.
6,267,818 B1 * 7/2001 Volpe, Jr. ................ B41F 15/44
118/103

FOREIGN PATENT DOCUMENTS

CN 209466811 U 10/2019
CN 111873612 A * 11/2020 .............. B41F 31/20
CN 108943998 B 4/2021
DE 4011146 A1 10/1991

OTHER PUBLICATIONS

International Search Report for PCT Application No. PCT/US2023/028541 mailed on Oct. 18, 2023.

* cited by examiner

*Primary Examiner* — Christopher E Mahoney
*Assistant Examiner* — Marissa Ferguson-Samreth
(74) *Attorney, Agent, or Firm* — Lando & Anastasi, LLP

(57) ABSTRACT

The present disclosure provides a scraping device (700) for a stencil printer comprising: a scraper holder (710), a scraper (720) having a travel path for squeegeeing a material to be dispensed on a stencil (130), the scraper (720) being arranged oblique to the stencil (130) and to the rear of the travel path; a mounting assembly (730) configured to mount the scraper (720) to the scraper holder (710). The mounting assembly (730) is further configured to be able to adjust the inclination angle of the scraper (720) relative to the stencil (130) and to maintain the scraper (720) at an adjusted angular position.

9 Claims, 9 Drawing Sheets

WIPING DEVICE FOR STENCIL PRINTER

CROSS REFERENCE TO RELATED APPLICATIONS

This application is a U.S. National Phase Application under 35 U.S.C. § 371 of International Application No. PCT/US2023/028541, filed Jul. 25, 2023, which claims priority to Chinese Priority application No. 2022108903519 filed on Jul. 27, 2022, and Chinese Priority application No. 2023108331124 filed Jul. 6, 2023. The entire contents of each application is hereby incorporated by reference in its entirety for all purposes.

TECHNICAL FIELD

The present disclosure generally relates to a scraper assembly in a stencil printer for printing a viscous material, such as a solder paste, onto a substrate, such as a printed circuit board.

BACKGROUND ART

In typical circuit board production processes, a stencil printer is used to print a solder paste onto a printed circuit board. The circuit board, which is also referred to broadly as an electronic substrate, has a pattern of solder pads or some other conductive surfaces that may deposit a solder paste, and the circuit board is automatically fed into a stencil printer. Certain holes or markings on the circuit board, referred to as reference points, are used to align the circuit board with a stencil or mesh board of a stencil printer before printing the solder paste onto the circuit board. The reference points are used as points for reference when aligning the circuit board with the stencil. Once the circuit board is aligned with the stencil of the printer, the circuit board is raised to the stencil by a substrate support and fixed relative to the stencil, and the stencil support may be, for example, a platform having a pin or other item support. The solder paste is then dispensed by moving a scraper or squeegee over the stencil so that the solder paste passes through the holes in the stencil and onto the circuit board. The solder paste is typically dispensed on the stencil from a standard solder paste feed cartridge. Upon completion of the printing operation, the circuit board is released, lowered, and detemplated before being conveyed to another location within a printed circuit board production line. As the scraper moves through the stencil, the solder paste rolls in front of the scraper, which causes the solder paste to be mixed as desired to obtain a desired viscosity to help fill the holes in the mesh board or stencil.

SUMMARY OF THE INVENTION

According to a first aspect of the present disclosure, the present disclosure provides a scraping device for a stencil printer, comprising a scraper holder; a scraper having a travel path for scraping a material to be dispensed on a stencil, the scraper being arranged oblique to the stencil and oblique to the rear of the travel path; a mounting assembly, configured to mount the scraper to the scraper holder. The mounting assembly is configured to be able to adjust the inclination angle of the scraper relative to the stencil and to maintain the scraper at an adjusted angle position.

According to the scraping device described above, the mounting assembly comprises a support column having an axis of rotation, the support column being connected to the scraper holder. The scraper is connected to the support column, the scraper has a length direction transverse to the travel path, and the length direction of the scraper is consistent with the direction of the axis of rotation. The inclination angle of the scraper relative to the stencil is adjusted by rotating the support column about the axis of rotation thereof.

According to the scraping device described above, the mounting assembly further comprises a pair of connecting blocks that each connect two axial ends of the support column to the scraper holder. The connecting blocks have a locked state and a released state. When the connecting blocks are in the released state, the support column is capable of adjusting the inclination angle of the scraper relative to the stencil by rotating about the axis of rotation thereof. When the connecting blocks are in the locked state, the connecting blocks restrict the support column from rotating about the axis of rotation thereof, so as to maintain the scraper at the adjusted angle position.

According to the scraping device described above, the connecting blocks comprise a hole and an opening in communication with the hole. The opening is disposed on one side of the hole. The hole is used to receive an axial end of the support column, the opening divides the connecting blocks into a first portion and a second portion, which are able to open and contract relative to one another to increase or decrease the size of the hole. The mounting assembly further comprises a fastener that detachably fastens the first and second portions at the opening such that the connecting blocks have the locked state and the released state.

According to the scraping device described above, it further comprises an angle indicating device. The angle indicating device is fixedly connected to the support column and is configured to indicate the inclination angle of the scraper relative to the stencil based on the position thereof relative to the connecting blocks.

According to the scraping device described above, the angle indicating device is an indicating plate. The indicating plate is connected to one axial end of the support column and is configured to rotate together with the support column.

According to the scraping device described above, the indicating plate has a reference edge. The reference edge is disposed parallel to the scraper. Angle graduations are provided on the connecting blocks, and the graduation which the reference edge points at represents the inclination angle of the scraper relative to the stencil.

According to the scraping device described above, the indicating plate is located on the connecting blocks, on the opposite side of the scraper.

According to the scraping device described above, a limiting groove is provided on the indicating plate. The limiting groove extends circumferentially and receives a limiting pin disposed on the connecting blocks.

According to the scraping device described above, the support column comprises a generally flat supporting surface located on a first side thereof.

According to the scraping device described above, the mounting assembly further comprises a support plate. The support plate is clamped between the supporting surface of the support column and the scraper. The scraper is able to bend around the bottom edge of the support plate.

According to a second aspect of the present disclosure, the present disclosure provides a stencil printer comprising the scraping device according to the first aspect described above.

DESCRIPTION OF EMBODIMENTS

Various specific embodiments of the present disclosure will be described below with reference to the appended drawings that form a part of the present Specification. It should be understood that while terms denoting orientation, such as "front", "rear", "upper", "lower", "left", "right", "top", "bottom", etc., are used in the present disclosure to describe various exemplary structural parts and elements of the present disclosure, these terms are used herein for convenience of illustration only and are determined based on the exemplary orientations shown in the appended drawings. Since the examples disclosed in the present disclosure may be disposed in different orientations, these terms denoting orientation are for illustrative purposes only and should not be considered as limiting.

Figure 1:
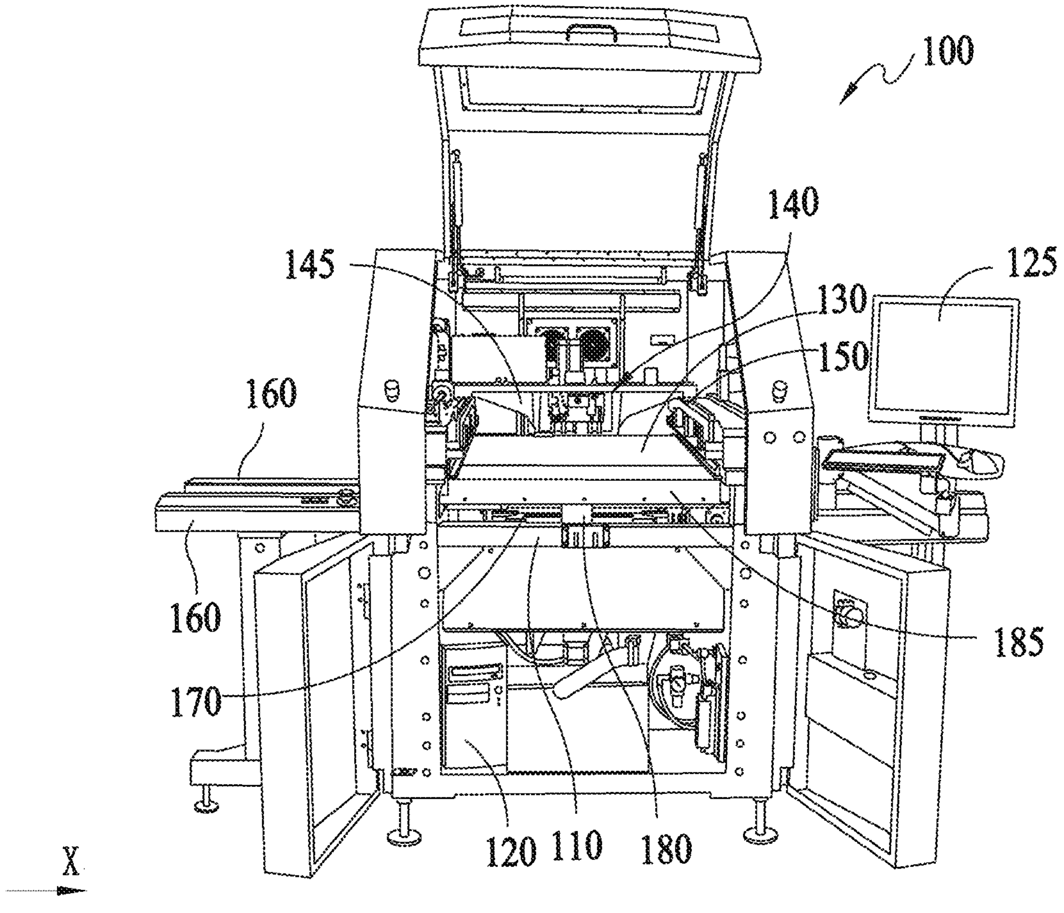
FIG. 1 is a perspective view of a stencil printer according to an example of the present disclosure.

FIG. 1 is a perspective view of a stencil printer 100 according to an example of the present disclosure. As shown in FIG. 1, the stencil printer 100 comprises a rack 110 that supports various components of the stencil printer. The components of the stencil printer 100 include a controller 120, a display 125, a stencil 130, and a print head assembly or print head 140 for applying materials to be dispensed (e.g., solder paste). The stencil 130 and the print head 140 may be suitably combined with or connected to the rack 110. In an example, the print head 140 may be mounted on a print head bracket 150, and the print head bracket 150 may be mounted on the rack 110. Under the control of the controller 140, the bracket 150 is capable of moving the print head 140 in a Y-axis direction perpendicular to an X-axis and a Z-axis. The print head 140 may be placed above the stencil 130 and a front scraper or a rear scraper of the print head 140 may be lowered in the Z-axis direction into contact with the stencil 130. Through the bracket 150, the scraper of the print head 140 may then move passing through the stencil 130 such that the solder paste is printed onto a circuit board.

The stencil printer 100 may also comprise a conveying system including a track 160 that is used to transport a printed circuit board (sometimes referred to as a "printed wire board," "substrate," or "electronic substrate") to a printing location inside the stencil printer 100. The track 160 is also referred to herein as a "feed-in mechanism" configured to provide, load, or transport a circuit board to a working area of the stencil printer 100 and remove the circuit board from the working area. The stencil printer 100 has a support assembly 170 to support a circuit board.

In some examples, the print head 140 may be disposed to obtain solder material from a source such as a dispenser (for example, a solder paste cartridge) that provides the solder paste to the print head during a printing operation. Other methods of providing solder paste may also be used in place of the solder paste cartridge. For example, the solder paste may be deposited manually between scrapers or the solder paste may also be from an external source. Further, in some examples, the controller 120 may be set up to control operation of the stencil printer 100 using a personal computer with a Microsoft DOS or Windows XP operating system having application-specific software. The controller 120 may be networked with a host controller that is used to control a production line of manufacturing circuit boards.

In some examples, the stencil printer 100 operates as follows. The circuit board is fed into the stencil printer 100 in the X-axis direction through the conveying track 160. The support assembly 170 raises and secures the circuit board in the printing position. The print head 140 then lowers a desired print head scraper in the Z-axis direction until the print head scraper contacts the stencil 130 at a desired pressure. The print head 140 is then moved through the stencil 130 in the Y-axis direction by the print head bracket 150. The print head 140 deposits the solder paste through the holes in the stencil 130 to fall on the circuit board. Once the print head 140 is fully across the stencil 130, the scraper is lifted away from the stencil 130 and the circuit board is lowered back to the conveying track 160. Subsequently, the circuit board is released and output from the stencil printer 100 so that a second circuit board can be loaded into the stencil printer 100. In order to print on the second circuit board, another scraper is brought into contact with the stencil along the Z-axis and the print head 140 is moved passing the stencil 130 in a direction opposite to that used for the first circuit board.

Still referring to FIG. 1, an imaging system 180 may be provided for aligning the stencil 130 with the circuit board before printing and inspecting the circuit board after printing. In an example, the imaging system 180 may be disposed between the stencil 130 and the support assembly 170 supporting the circuit board. The imaging system 180 is connected to an imaging bracket 185 to move the imaging system. In an scraper assembly, the imaging bracket 185 may be connected to the rack 110 and the imaging bracket 185 comprises a beam extending between side rails of the rack 110 to allow the imaging system 180 to move back and forth in the Y-axis direction above the circuit board. The imaging bracket 185 may also comprise a transport device enclosing the imaging system 180 from outside and disposed to move in the X-axis direction along the length direction of the beam. The structure of the imaging bracket 185 for moving the imaging system 180 is well known in the field of solder paste printing. The approach is as follows. The imaging system 180 may be located at any location under the stencil 130, above the circuit board, in order to obtain an image of a predetermined area of the circuit board or the stencil, respectively.

In an scraper assembly, the print head 140 comprises a frame member 145 that forms a portion of the bracket 150. The frame member 145 is configured to move along a printing direction, such as the Y-axis direction. In particular, the frame member 145 is configured to slide along a linear track (not shown in FIG. 1) of the rack 110 of the stencil printer 100 at opposite ends thereof. This structure allows the print head bracket 150 to move in the Y-axis direction. In an scraper assembly, the frame member 145 supports a scraping device having a front scraper and a rear scraper and a movement mechanism configured to move the scrapers independently. Under the control of respective movement mechanisms, each scraper is configured to move along the Z-axis direction from a higher position having a certain spacing with the stencil 130 to a lower position engaging the stencil 130 and applying pressure to the stencil 130.

Figure 2A:
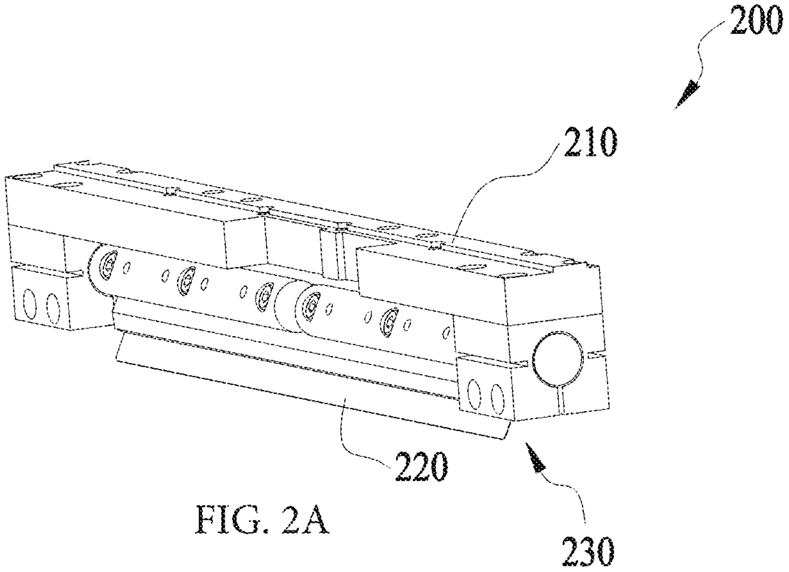
FIG. 2A is a perspective view of one perspective of a scraping device according to an example of the present disclosure.
Figure 2B:
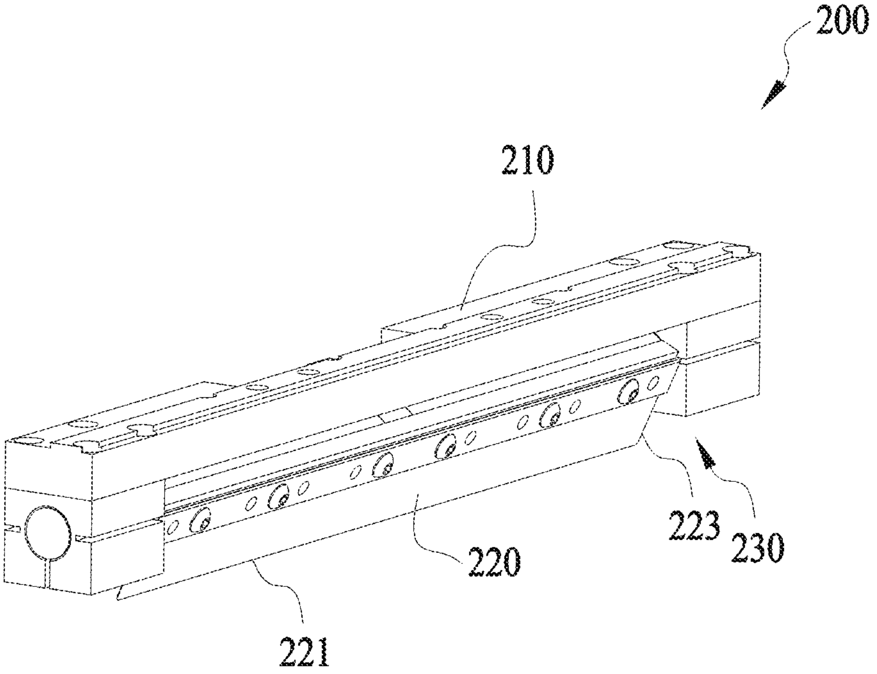
FIG. 2B is a perspective view of another perspective of the scraping device in FIG. 2A.

FIGS. 2A and 2B show the overall structure of the scraping device 200 according to an scraper assembly of the present disclosure, in which FIG. 2A is a perspective view of a perspective of the scraping device 200 and FIG. 2B is a perspective view of another perspective of the scraping device 200 in FIG. 2A. As shown in FIGS. 2A and 2B, the scraping device 200 comprises a scraper holder 210, a scraper 220, and a mounting assembly 230 for mounting the scraper 220 to the scraper holder 210. The scraper holder 210 is connected to the movement mechanism of the scraper (not shown in the figure). The scraper 220 is, for example, a front scraper, and for ease of illustration, only the front scraper and mounting components thereof are shown in the scraping device 200 shown in FIGS. 2A to 2C, while the rear scraper and mounting components thereof are removed. Further, the scraping device 200 may also comprise other components not shown in the figures.

The scraper 220 has a travel path for scraping a material (solder paste) to be dispensed on the stencil 130, and the travel path extends along the Y-axis direction. The scraper 220 is generally rectangular with a length edge 221 and a width edge 223. The length direction of the scraper 220 is transverse to the travel path, consistent with the X-axis direction. The scraper 220 is arranged oblique to the stencil 130 and oblique to the rear of the travel path to apply pressure to the material to be dispensed on the stencil 130 through the scraper 220, causing the material to be dispensed to fall on an electronic substrate beneath the stencil 130 through the holes on the stencil 130. The mounting assembly 230 is able to adjust the inclination angle of the scraper 220 relative to the stencil 130 in addition to being able to mount the scraper 220 to the scraper holder 210. Also, the mounting assembly 230 is able to maintain the scraper 220 at the adjusted angle position such that scraper 220 is able to perform the scraping operation at the adjusted inclination angle.

Figure 3A:
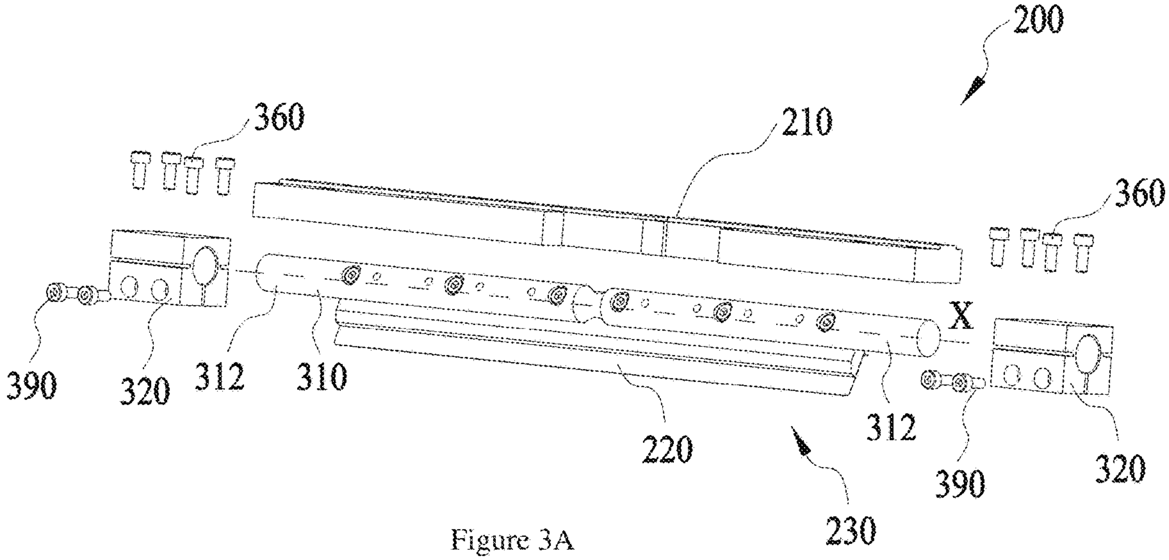
FIG. 3A is an exploded view of the scraping device shown in FIG. 2A.
Figure 3B:
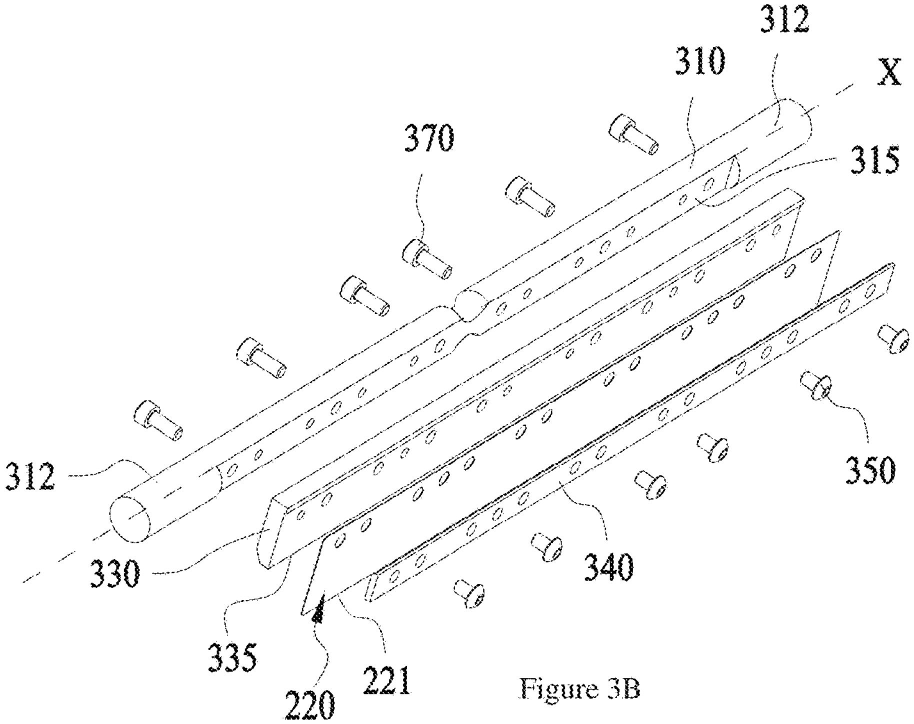
FIG. 3B is an exploded view of some components of the scraping device shown in FIG. 2A.

FIGS. 3A and 3B show specific components of the mounting assembly 230. In which, FIG. 3A is an exploded view of the scraping device 200 and FIG. 3B is an exploded view of some components of the scraping device 200. As shown in FIGS. 3A and 3B, the mounting assembly 230 comprises a support column 310 for supporting and retaining the scraper 220 and a pair of connecting blocks 320 for connecting the support column 310 to the scraper holder 210. The mounting assembly 230 further comprises a support plate 330 and a backing plate 340 for better connecting and retaining the scraper 220 on the support column 310.

The support column 310 is generally cylindrical with an axis of rotation X, and a pair of connecting blocks 320 each connecting two axial ends 312 of the support column 310 to the scraper holder 210. The length direction of the scraper 220 is consistent with the direction of the axis of rotation X, and the inclination angle of the scraper 220 relative to the stencil 130 is adjusted by rotating the support column 310 about the axis of rotation X thereof. The support column 310 comprises a generally flat supporting surface 315 disposed on a first side thereof. The supporting surface 315 is formed, for example, by cutting a portion of the support column 310, which extends along the axis of rotation X more than the length edge 221 of the scraper 220. The support plate 330 is generally rectangular, and is clamped between the supporting surface 315 and the scraper 220, and the supporting surface 315, the support plate 330, and the scraper 220 are generally parallel. The support plate 330 has a bottom edge 335 and the scraper 220 is able to bend around the bottom edge 335 of the support plate 330 towards the rear of the travel path thereof to better perform the scraping operation. The support plate 330 is used to expand the area of the surface that supports the scraper 220. Of course, in some scraper assemblies, the supporting surface 315 on the support column 310 may be set up to be large enough such that the mounting assembly 230 does not comprise the support plate 330.

To connect the scraper 220, the support plate 330, and the support column 310, scraper assemblies of the present disclosure are disposed with two sets of fasteners, namely, a first set of fasteners 350 and a second set of fasteners 370, the first set of fasteners 350 first connecting the scraper 220 to the support plate 330 as a subassembly, and then the second set of fasteners 370 connecting the subassembly of the scraper 220 and the support plate 330 to the support column 310. In particular, the first set of fasteners 350 connect the scraper 220 to the support plate 330 from a first side of the support column 310 (i.e., the side on which the supporting surface 315 is disposed), and the second set of fasteners 370 connect the support plate 330 to the support column 310 from a second side of the support column 310 that is opposite the first side. The first set of fasteners 350 comprises a plurality of fasteners, such as bolts. The second set of fasteners 370 also comprises a plurality of fasteners, such as bolts. As the scraper 220 is connected to the support column 310, the rotational position of the support column 310 about the axis of rotation X thereof may be adjusted, i.e., the inclination angle of the scraper 220 relative to the stencil 130 may be adjusted.

A pair of connecting blocks 320 are respectively connected to the scraper holder 210 by a number of fasteners (e.g., bolts) 360.

Figure 4A:
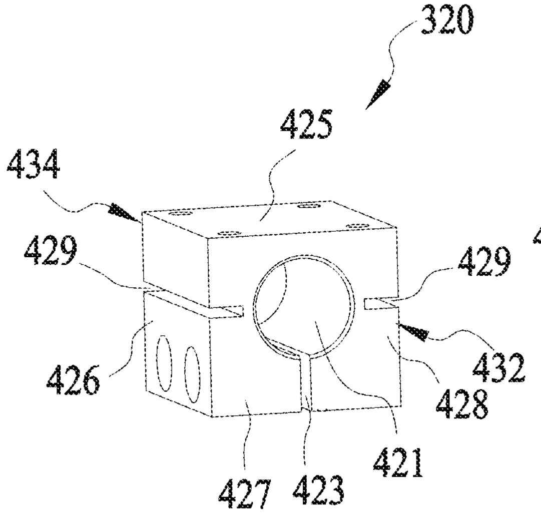
FIG. 4A is a perspective view of a connecting block in the scraping device shown in FIG. 2A.
Figure 4B:
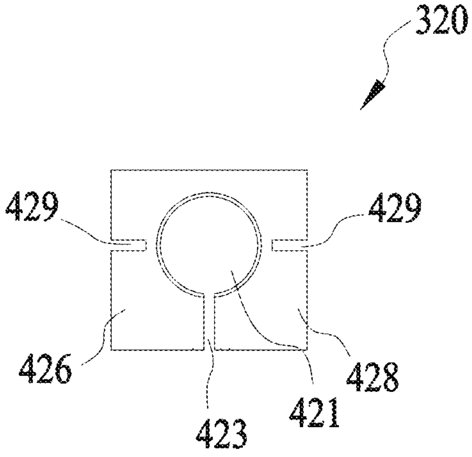
FIG. 4B is a side view of a connecting block in the scraping device shown in FIG. 2A.

FIGS. 4A and 4B show the specific structure of one connecting block 320 of the pair of connecting blocks 320 of the mounting assembly 230, and the structure of the pair of connecting blocks 320 is identical. In which, FIG. 4A is a perspective view of a connecting block 320 and FIG. 4B is a side view of a connecting block 320. As shown in FIGS. 4A and 4B, the connecting block 320 is generally square and is connected to the scraper holder 210 at the top 425 thereof.

The connecting block 320 comprises a hole 421 that runs through a first side 432 and a second side 434 that are opposite each other, comprises an opening 423 in communication with the hole 421, is disposed at the bottom 427 of the connecting block 320, and also runs through the first side 432 and the second side 434 of the connecting block 320.

The opening 423 divides the connecting block 320 into a first portion 426 and a second portion 428 that may be deflected relative to one another. The first portion 426 and the second portion 328 are connected at the top 425 of the connecting block 320 and separated by the opening 423 at the bottom 427 of the connecting block 320, so the first portion 426 and the second portion 428 may be opened and contracted relative to one another. The hole 421 is jointly formed by the inner walls of the first and second portions 426 and 428 whereby the radial dimensions (e.g., cross-sections) of the hole 421 may be increased and decreased by opening and contracting the first and second portions 426 and 428 relative to one another. The hole 421 is used to receive the axial end 312 of the support column 310, which may be clamped by the connecting block 320 when the radial dimension of the hole 421 is reduced, and the axial end 312 of the support column 310 may be disengaged by the connecting block 320 when the radial dimension of the hole 421 is increased.

The mounting assembly 230 further comprises a fastener 390 that detachably fastens the first portion 426 and the second portion 428 together by passing through the opening 423. The fastener 390 allows the connecting block 320 to have a locked state and a released state. When the fastener 390 is loosened such that the first and second portions 426 and 328 [sic: 428] of the connecting block 320 open relative to one another, the connecting block 320 is in the released state and the axial end 312 of the support column 310 is disengaged by the connecting block 320. Hence, the support column 310 is able to adjust the inclination angle of the scraper 220 relative to the stencil 130 by rotating about the axis of rotation X thereof. When the fastener 390 is fastened such that the first and second portions 426 and 328 [sic: 428] of the connecting block 320 are unable to open relative to one another, the connecting block 320 is in the locked state and the axial end 312 of the support column 310 is clamped by the connecting block 320. Hence, the connecting block 320 limits the rotation of the support column 310 about the axis of rotation X thereof, thereby maintaining the scraper 220 at the adjusted angle position.

A slot 429 is provided on both the first and second portions 426 and 428 of the connecting block 320, and the slot 429 also runs through the first and second sides 432 and 434 of the connecting block 320, but the slot 429 is not in communication with the hole 421. The slot 429 divides the first portion 426/second portion 428 of the connecting block 320 into two sections that are connected to each other such that the connections thereof are very thin, thereby increasing the deformability (i.e., weakening the rigidity thereof) of the first and second portions 426 and 428 and making it easier for the first and second portions 426 and 328 [sic: 428] to open and contract with respect to one another.

Figure 5:
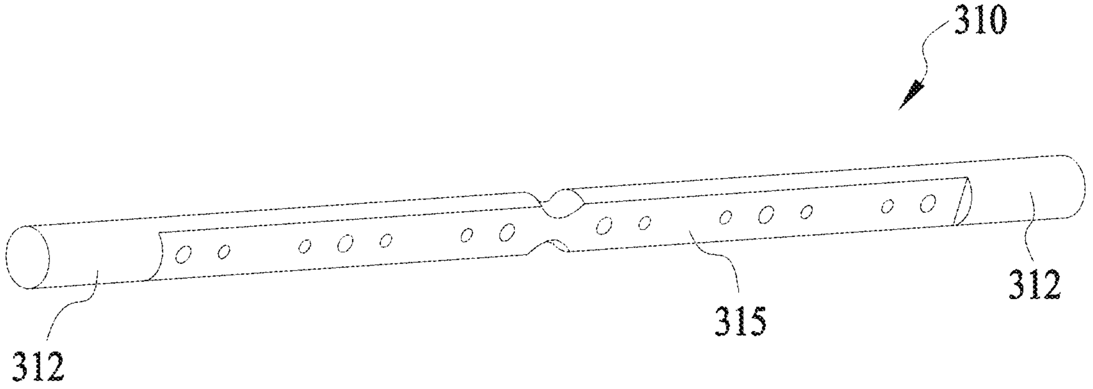
FIG. 5 is a perspective view of a support column in the scraping device shown in FIG. 2A.

FIG. 5 shows the specific structure of the support column 310 in the mounting assembly 230. As shown in FIG. 5, the axial ends 312 of the support column 310 are still cylindrical, and the supporting surface 315 is located between the axial ends 312.

Figure 6A:
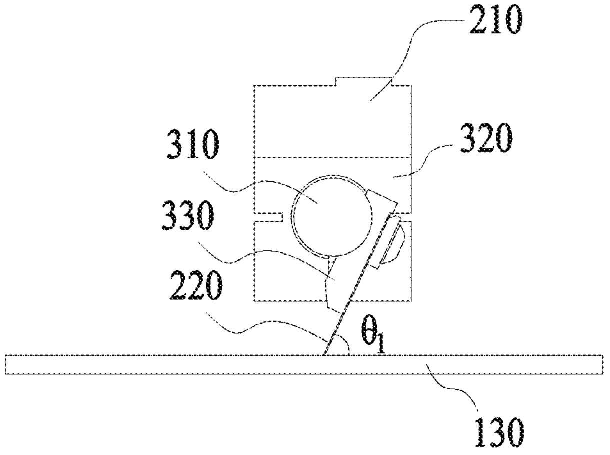
FIG. 6A is a side view of a scraper in the scraping device shown in FIG. 2A relative to the stencil at a first inclination angle position.
Figure 6B:
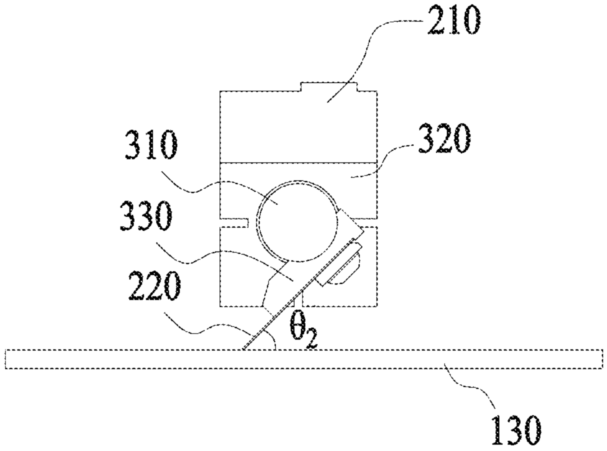
FIG. 6B is a side view of the scraper in the scraping device shown in FIG. 2A relative to the stencil at a second inclination angle position.

FIGS. 6A and 6B show side views of the scraper 220 relative to the stencil 130 in the first and second inclination angle positions, respectively. In FIG. 6A, the included angle between the scraper 220 and the stencil 130 is $\theta_1$ and in FIG. 6B, the included angle between the scraper 220 and the stencil 130 is $\theta_2$, in which $\theta_1$ is greater than $\theta_2$. The included angle between the scraper 220 and the stencil 130 (i.e., the inclination angle of the scraper 220 relative to the stencil 130) is achieved by having the support column 310 rotate about the axis of rotation X thereof, and the rotation of the support column 310 causes the scraper 220 connected thereto to rotate together, thereby adjusting the inclination angle of the scraper 220 relative to the stencil 130. When it is necessary to adjust the inclination angle of the scraper 220 relative to the stencil 130, loosening the fastener 390 (FIG. 3A) allows the connecting block 320 to move from the locked state to the released state, i.e., rotates the support column 310 about the axis of rotation X thereof. When the inclination angle of the scraper 220 relative to the stencil 130 is adjusted to the desired angle, tightening the fastener 390 (FIG. 3A) allows the connecting block 320 to move from the released state to the locked state, i.e., limits the rotation of the support column 310 about the axis of rotation X thereof, thereby maintaining the scraper 220 at the adjusted angle position.

Figure 7A:
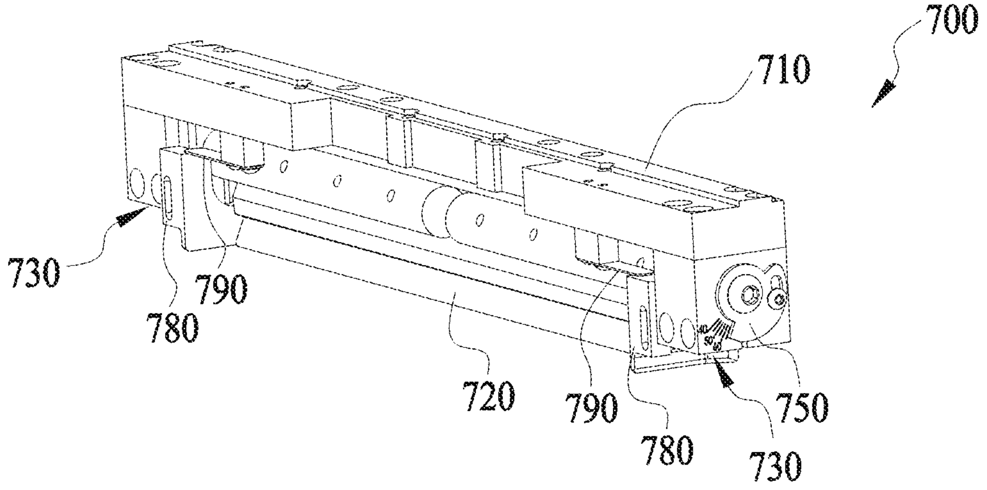
FIG. 7A is a perspective view of one perspective of a scraping device according to another example of the present disclosure.
Figure 7B:
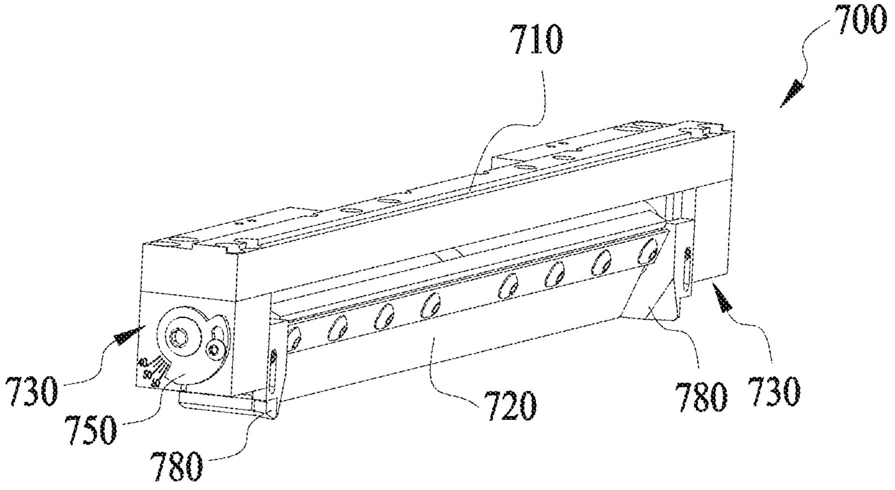
FIG. 7B is a perspective view of another perspective of the scraping device in FIG. 7A.

FIGS. 7A and 7B show a scraping device 700 according to another scraper assembly of the present disclosure, in which FIG. 7A is a perspective view of a perspective of the scraping device 700 and FIG. 7B is a perspective view of another perspective of the scraping device 700. The scraping device 700 shown in FIGS. 7A and 7B is similar to the scraping device 200 shown in FIGS. 2A and 2B and also comprises a scraper holder 710, a scraper 720, and a mounting assembly 730 for mounting the scraper 720 to the scraper holder 710, and the mounting assembly 730 is able to adjust the inclination angle of the scraper 720 relative to the stencil 130. The scraping device 700 differs from the scraping device 200 in that the scraping device 700 further comprises an angle indicating device for indicating the inclination angle of the scraper 720 relative to the stencil 130. Further, the scraping device 700 further comprises a pair of up-and-down-movable baffles 780 disposed on opposite sides of the travel path of the scraper 720 and a pair of elastic plates 790 for resetting the pair of baffles 780, respectively.

Figure 8A:
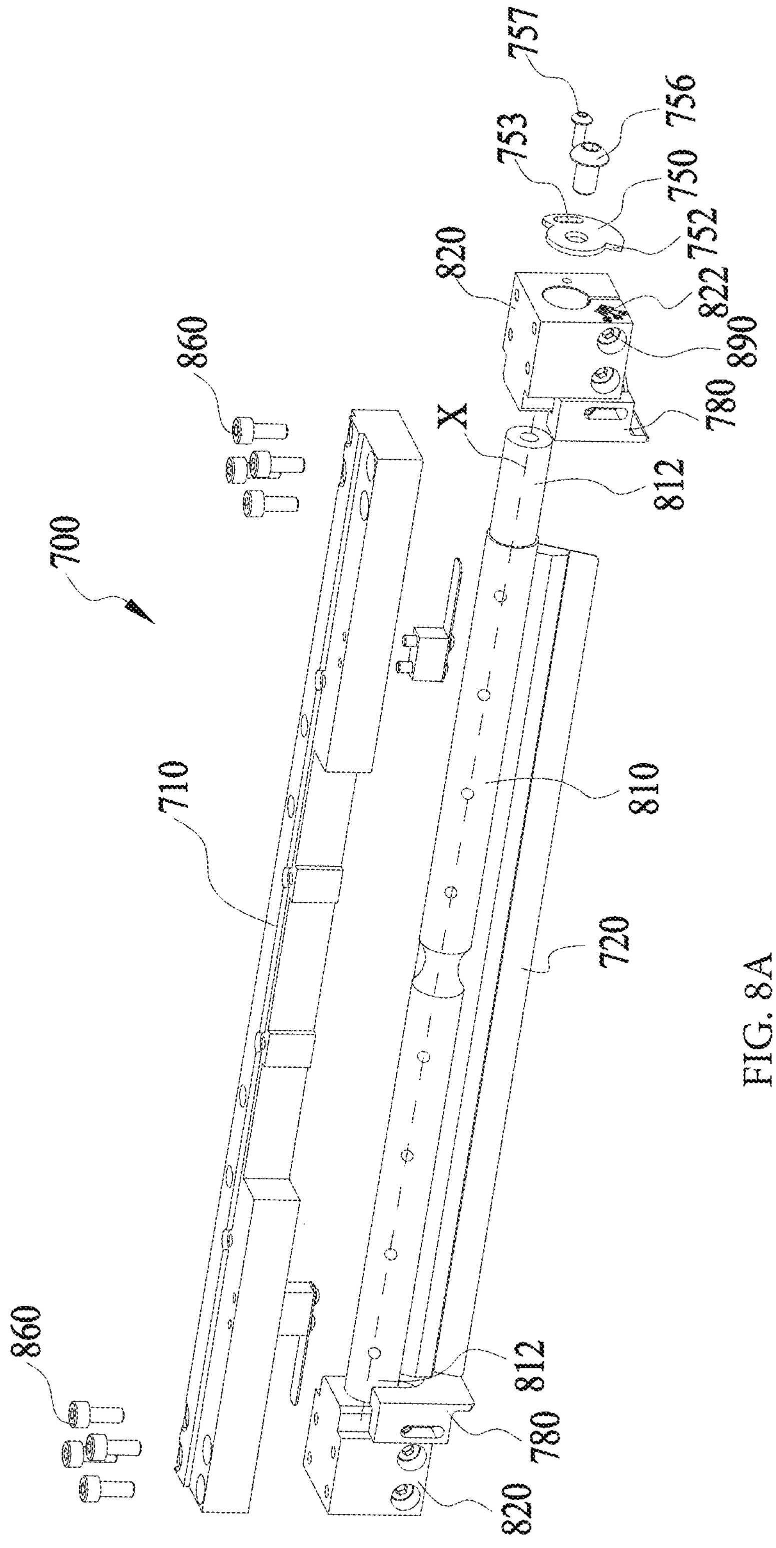
FIG. 8A is a partially exploded view of the scraping device in FIG. 7A.
Figure 8B:
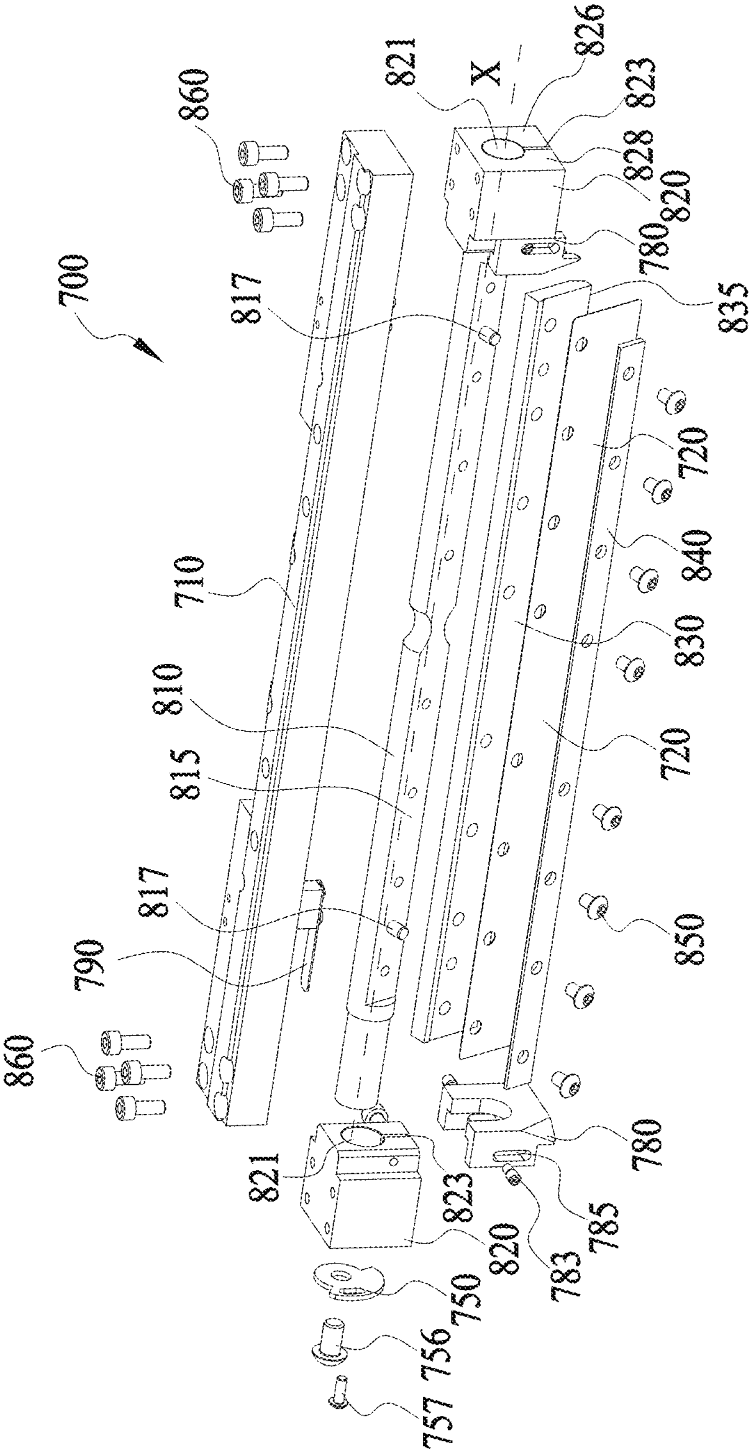
FIG. 8B is another partially exploded view of the scraping device in FIG. 7A.

FIGS. 8A and 8B show the specific structure of the scraping device 700, where FIG. 8A is a partially exploded view of the scraping device 700, FIG. 8B is another partially exploded view of the scraping device 700, and FIG. 8B shows a perspective of FIG. 8A from the rear side. As shown in FIGS. 8A and 8B, the mounting assembly 730 comprises a support column 810 and a pair of connecting blocks 820 that are connected to the scraper holder 710 by a number of fasteners (e.g., bolts) 860, respectively. The mounting assembly 730 further comprises a support plate 830 and a backing plate 840 for better connecting and retaining the scraper 720 on the support column 810. The support column 810, the support plate 830, and the backing plate 840 are each identical in structure to that of the support column 310, the support plate 330, and the backing plate 340 of the scraping device 200 and thus will not be described herein. The connecting blocks 820 are structurally similar to the connecting blocks 320 of the scraping device 200, except that the connecting blocks 320 are disposed with a slot 429 and the connecting blocks 820 are not. The connecting blocks 820 comprise a hole 821 and an opening 823 in communication with the hole 821 that is disposed on one side of the hole 821. The opening 823 divides the connecting blocks 820 into a first portion 826 and a second portion 828, which are able to open and contract relative to one another to increase or decrease the size of the hole 821. The first portion 826 and the second portion 828 are detachably fastened at the opening 823 by a fastener 890 such that the connecting blocks 820 have the locked state and a released state. When the connecting blocks 820 are in the released state, the support column 310 is able to rotate to adjust the inclination angle of the scraper 720 relative to the stencil 130. When the connecting blocks 820 are in the locked state, the support column 310 is unable to rotate, thereby maintaining the scraper 720 at an adjusted angle position.

Unlike the scraping device 200 connecting the support column 310, the support plate 330, the scraper 220, and the backing plate 340 by two sets of fasteners, the scraping device 700 connects the support column 810, the support plate 830, the scraper 720, and the backing plate 840 by positioning pins 817 disposed on the support column 810 and a set of fasteners 850. In particular, the support plate 830 is first positioned relative to the support column 810 by the positioning pins 817 and then the support plate 830, the scraper 720, and the backing plate 840 are fastened on the support column 810 by fastening assemblies 850. As such, the scraper 720 is clamped between the support plate 830 and the backing plate 840 and are able to bend around the bottom edge 835 of the support plate 830. A support plate 830 abuts a supporting surface 815 of the support column 310. The rotational position of the support column 810 about the axis of rotation X thereof may be adjusted, i.e., the inclination angle of the scraper 720 relative to the stencil 130 may be adjusted.

Still as shown in FIGS. 8A and 8B, the scraper assembly 700 further comprises an angle indicating device fixedly connected to the support column 810. The position of the angle indicating device relative to the connecting blocks 820 may indicate the inclination angle of the scraper 720 relative to the stencil 130. The angle indicating device is, for example, an indicating plate 750, which is fastened to one axial end of the support column 810 with a fastener 756 and is configured to rotate together with the support column 810. The indicating plate 750 is positioned on the opposite side of the connecting block 820 from the support column 810. As can be seen from FIGS. 8A and 8B, the support column 810 is positioned on the inner side of the connecting blocks 820, while the indicating plate 750 is positioned on the outer side of the connecting blocks 820. The indicating plate 750 is generally fan-shaped and comprises a reference edge 752 disposed parallel to the scraper 720 (see FIGS. 9A and 9B). Angle graduations 822 are provided on the connecting blocks 820, and the graduation which the reference edge 752 points at represents the inclination angle of the scraper 720 relative to the stencil 130.

In addition, a limiting groove 753 is also provided on the indicating plate 750, and the limiting groove 753 extends circumferentially. A limiting pin 757 is provided on the connecting block 820 and may be received in the limiting groove 753 and move along the limiting groove 753 as the indicating plate 750 rotates. The limiting groove 753 mates with the limiting pin 757 to limit the range of rotation of the indicating plate 750, so as to facilitate angle adjustment of the scraper 720.

Still as shown in FIGS. 8A and 8B, a pair of baffles 780 of the scraper assembly 700 are used to retain the solder paste on the travel path of the scraper 720 during the squeegeeing of material to be dispensed (solder paste) by the scraper 720. The baffles 780 are movably connected to the connecting blocks 820 up and down by a fastener 783. The baffles 780 are disposed on the side of the connecting blocks 820 that is connected to the support column 810. The baffles 780 are generally U-shaped, thus having a space to evade the support column 810 such that the baffles 780 do not interfere with the support column 810 during the up-and-down movement. A pair of chutes 785 are provided on the baffles 780, and the fastener 783 disposed on the connecting blocks 820 is received in the chutes 785 and is capable of moving along the chutes 785, thereby allowing movement of the baffles 780 relative to the connecting blocks 820.

A certain amount of pressure needs to be applied on the stencil 130 when squeegeeing the solder paste with the scraper 720, and thus the scraper assembly 700 is lowered relative to the stencil 130, causing the scraper 720 to deform in order to apply the pressure. To retain the solder paste on the travel path of the scraper 720, it is necessary that the bottom-most ends of the pair of baffles 780 and the bottom-most end of the scraper 720 are all in contact with the stencil 130 when in operation. Thus, in order to retain the solder paste on the travel path of the scraper 720 without affecting the operation of the scraper 720, the baffles 780 need to be capable of moving up and down relative to the connecting blocks 820 and scraper holder 710. That is, the baffles 780 need to be moved upwards when the pressure is applied to the stencil with the scraper 720 and the stencil deforms, and the baffles 780 need to be moved downwards when pressure is no longer applied or less pressure is applied to the stencil with the scraper 729 to restore the stencil. In this way, the bottom-most ends of the baffles 780 are always on the same plane as the bottom-most end of the scraper 720 (i.e., both in contact with the stencil 130) and the baffles 780 are always holding the solder paste on the travel path of the scraper 720 without affecting the operation of the scraper 720. To allow the baffles 780 to move up and down relative to the mounting block 820 with the deformation of the scraper 720, the scraper assembly 700 further comprises a pair of elastic plates 790 that are connected to the scraper holder 710 and respectively extend to positions above the pair of baffles 780. Moreover, the pair of elastic plates 790 is configured to be elastically deformed by the thrust of the baffles 780 when the pair of baffles 780 move upwards, and to allow the pair of baffles 780 to move downwards by the restoring force.

Figure 9A:
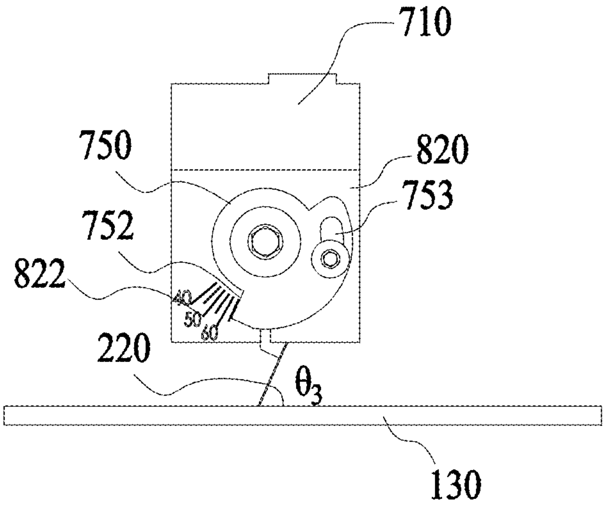
FIG. 9A is a side view of a scraper in the scraping device shown in FIG. 7A relative to the stencil at a first inclination angle position.
Figure 9B:
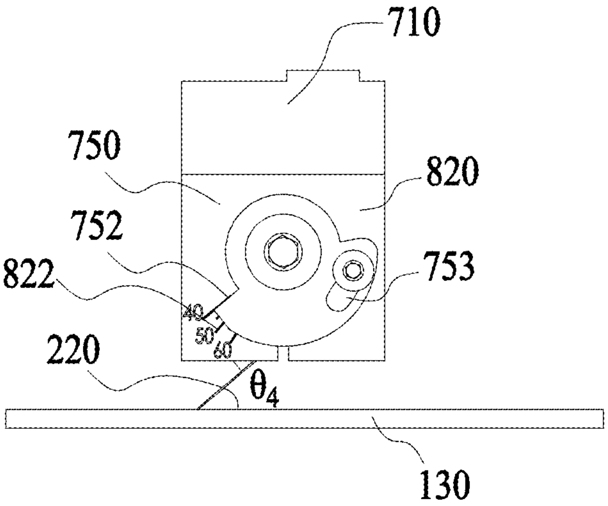
FIG. 9B is a side view of the scraper in the scraping device shown in FIG. 7A relative to the stencil at a second inclination angle position.

FIGS. 9A and 9B are side views of the scraper 720 in the scraping device 700 relative to the stencil 130 at a first inclination angle position and second inclination angle position, respectively, in which the baffles 780 are not shown to reveal the scraper 720. In FIG. 9A, the included angle between the scraper 720 and the stencil 130 is $\theta_3$ and in FIG. 9B, the included angle between the scraper 220 and the stencil 130 is $\theta_4$. As shown in FIG. 9A, the reference edge 752 of the indicating plate 750 is aligned with an angle graduation of 65 degrees, which indicates that the included angle $\theta_3$ between the scraper 720 and the stencil 130 is 65 degrees. As shown in FIG. 9B, the reference edge 752 of the indicating plate 750 is aligned with an angle graduation of 40 degrees, which indicates that the included angle $\theta_4$ between the scraper 720 and the stencil 130 is 40 degrees. Through the angle indicated by the reference edge 752 of the indicating plate 750, the operator is able to easily identify and adjust the inclination angle of the scraper 720 relative to the stencil.

The inventors of the present disclosure have found through long-term observation that the inclination angle of the scraper of existing stencil printers relative to the stencil is not adjustable, i.e., regardless of the viscosity of the material to be dispensed, the size of the hole on the stencil, etc., the inclination angle of the scraper relative to the stencil is the same, so the same pressure is always applied to the stencil by the scraper, which makes the falling speed of materials to be dispensed of the stencil printer from the stencil on the electronic substrate beneath the stencil often failing to reach the desired speed. To this end, the present disclosure provides a scraper assembly and a stencil printer using the scraper assembly, the scraper assembly of the present disclosure being disposed with a mounting assembly such that the angle of the scraper relative to the stencil is adjustable as desired and is capable of maintaining the stencil at the adjusted angle position. More specifically, when used on site, various influencing factors may also be taken into consideration, such as the viscosity of the material to be dispensed, the size of the hole on the stencil, etc., to adjust the angle of the scraper relative to the stencil, such that the material to be dispensed that is squeegeed by the scraper falls on the electronic substrate beneath the stencil at a desired speed from the hole on the stencil. Moreover, the mounting assembly of the scraper assembly of the present disclosure for adjusting the angle of the scraper relative to the stencil is not only simple in structure, but also easy to operate, thereby enabling on-site commissioning operators to easily adjust the angle of the scraper relative to the stencil.

Although the present disclosure has been described in conjunction with the examples of scraper assemblies outlined above, various alternatives, modifications, variations, improvements, and/or substantial equivalents, whether known or foreseeable now or in the near future, may be apparent to those having at least ordinary skill in the art. In addition, the technical effects and/or technical problems described in the present Specification are exemplary and not limiting; therefore, the disclosure in the present Specification may be used to solve other technical problems and have other technical effects and/or may solve other technical problems. Therefore, the examples of scraper assemblies of the present disclosure as set forth above are intended to be illustrative and not limiting. Various changes may be made without departing from the spirit or scope of the present disclosure. Therefore, the present disclosure is intended to include all known or earlier developed alternatives, modifications, variations, improvements and/or substantial equivalents.

The invention claimed is:

1. A scraping device for a stencil printer, wherein comprising a scraper holder;

a scraper having a travel path for squeegeeing a material to be dispensed on a stencil, the scraper being arranged oblique to the stencil and oblique to a rear of the travel path; and a mounting assembly, configured to mount the scraper to the scraper holder, in which, the mounting assembly is configured to be able to adjust an inclination angle of the scraper relative to the stencil and to maintain the scraper at an adjusted angle position, the mounting assembly including a support column having an axis of rotation, the support column being connected to the scraper holder, the scraper being connected to the support column, the scraper having a length direction transverse to the travel path, with the length direction of the scraper being consistent with a direction of the axis of rotation, the inclination angle of the scraper relative to the stencil being adjusted by rotating the support column of the axis of rotation thereof, the support column including a generally flat supporting surface positioned on a first side thereof, a support plate clamped between the supporting surface of the support column and the scraper, the scraper being able to bend around a bottom edge of the support plate, and a backing plate configured to secure the scraper and the support plate to the support column, the support plate and the backing plate being configured to clamp the scraper in place.

2. The scraping device according to claim 1, wherein the mounting assembly further comprises a pair of connecting blocks connecting two axial ends of the support column to the scraper holder respectively;

in which, the connecting blocks have a locked state and a released state; when the connecting blocks are in the released state, the support column is capable of adjusting the inclination angle of the scraper relative to the stencil by rotating about the axis of rotation thereof; when the connecting blocks are in the locked state, the connecting blocks restrict the support column from rotating about the axis of rotation thereof, so as to maintain the scraper at the adjusted angle position.

3. The scraping device according to claim 2, wherein the connecting blocks comprise a hole and an opening in communication with the hole, the opening being disposed on one side of the hole for receiving an axial end of the support column; the opening divides the connecting blocks into a first portion and a second portion which are able to open and contract relative to one another to increase or decrease the size of the hole;

in which, the mounting assembly further comprises a fastener that detachably fastens the first portion and second portion at the opening such that the connecting blocks have the locked state and the released state.

4. The scraping device according to claim 2, wherein further comprising an angle indicating device is fixedly connected to the support column and is configured to indicate the inclination angle of the scraper relative to the stencil based on the position thereof relative to the connecting blocks.

5. The scraping device according to claim 4, wherein the angle indicating device is an indicating plate connected to one axial end of the support column and configured to rotate together with the support column.

6. The scraping device according to claim 5, wherein the indicating plate has a reference edge disposed parallel to the scraper;

angle graduations are provided on the connecting block, and a graduation pointing at the reference edge represents the inclination angle of the scraper relative to the stencil.

7. The scraping device according to claim 5, wherein the indicating plate is located on the connecting blocks, on an opposite side of the scraper.

8. The scraping device according to claim 5, wherein a limiting groove is provided on the indicating plate, which extends circumferentially and receives a limiting pin disposed on the connecting blocks.

9. A stencil printer, wherein comprising the scraping device according to claim 1.

* * * * *